(12) United States Patent
Rapisarda

(10) Patent No.: US 8,789,965 B2
(45) Date of Patent: Jul. 29, 2014

(54) MSOLDER-LESS ELECTRICAL ASSEMBLY AND PROCESS FOR ITS MANUFACTURE

(76) Inventor: Carmen Rapisarda, Apple Valley, CA (US)

(*) Notice: Subject to any disclaimer, the term of this patent is extended or adjusted under 35 U.S.C. 154(b) by 442 days.

(21) Appl. No.: 13/294,095

(22) Filed: Nov. 10, 2011

(65) Prior Publication Data
US 2013/0120977 A1 May 16, 2013

(51) Int. Cl.
| F21L 4/00 | (2006.01) |
| F21V 21/08 | (2006.01) |
| F21V 23/02 | (2006.01) |
| F21K 99/00 | (2010.01) |
| A43B 3/00 | (2006.01) |

(52) U.S. Cl.
CPC ............... *F21V 23/023* (2013.01); *F21K 9/30* (2013.01); *F21K 9/90* (2013.01); *A43B 3/001* (2013.01)
USPC .......................................... 362/194; 362/103

(58) Field of Classification Search
CPC ...... A43B 3/001; A43B 3/005; A43B 1/0036; F21K 9/30; F21K 9/90; F21V 23/023; F21V 23/0485
USPC ............................................. 362/103, 194
See application file for complete search history.

(56) References Cited

U.S. PATENT DOCUMENTS

| 4,140,360 A | 2/1979 | Huber |
| 4,758,927 A | 7/1988 | Berg |
| 5,881,453 A | 3/1999 | Avery et al. |
| 5,947,580 A | 9/1999 | Chien |
| 6,062,901 A | 5/2000 | Liu et al. |
| 6,991,488 B2 | 1/2006 | Freakes |
| 7,147,337 B1 * | 12/2006 | Rapisarda ..................... 362/103 |
| 7,556,543 B2 | 7/2009 | Weber |
| 7,591,672 B2 | 9/2009 | Wu |
| 8,004,856 B2 | 8/2011 | Rapisarda |
| 2001/0037565 A1 | 11/2001 | Prasad et al. |
| 2006/0107523 A1 | 5/2006 | Blossfeld et al. |

* cited by examiner

*Primary Examiner* — Sean Gramling
(74) *Attorney, Agent, or Firm* — Roy L. Anderson; Wagner, Anderson & Bright PC

(57) ABSTRACT

An electrical assembly, and a process for manufacturing it, in which the electrical assembly has a battery held within a battery block, a switch assembly attached to the battery block, a ribbon wire assembly held within a ribbon block and a PCB held within the battery and ribbon blocks. Two conductors in the battery block create electrical connections between the battery and the PCB after the battery is inserted into and held within the battery block. The ribbon wire assembly has one or more wires, preferably two or more, each of which has a protective covering with a gap that allows the wire to form an electrical connection with the PCB. All of the electrical connections between the PCB and the battery, the switch assembly and the ribbon wire assembly are made without the use of any solder.

17 Claims, 3 Drawing Sheets

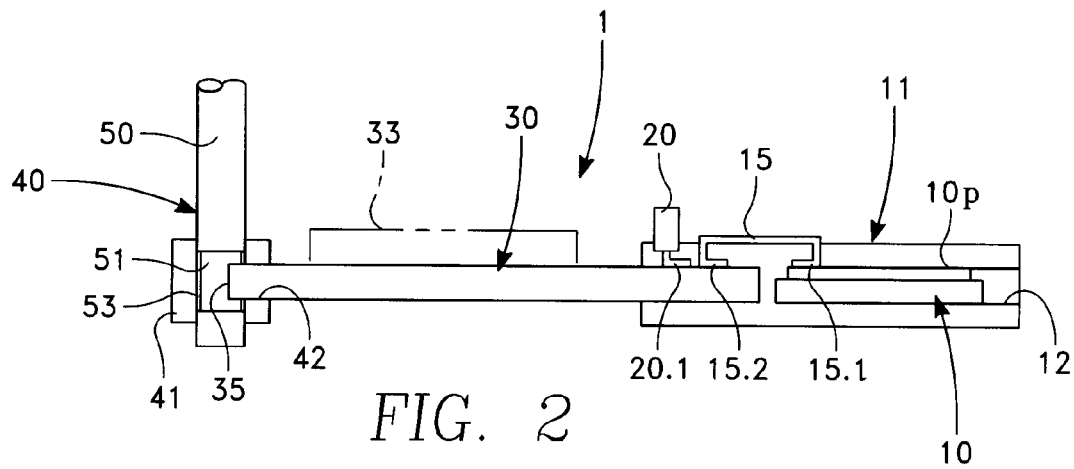
FIG. 2
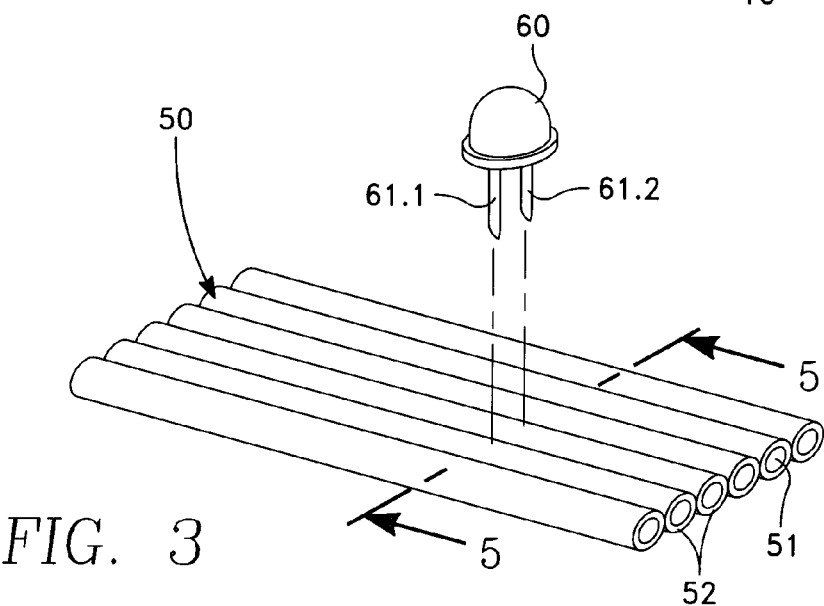
FIG. 3
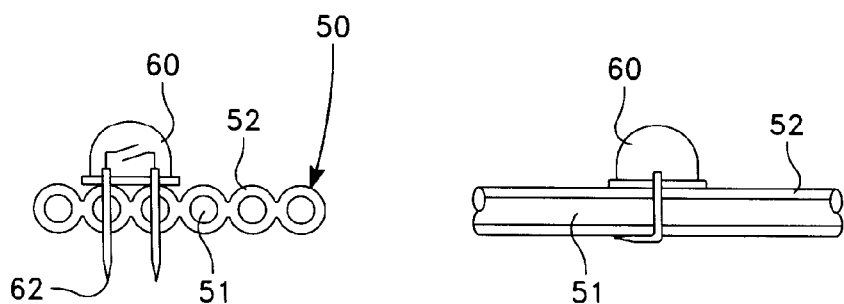
FIG. 4
FIG. 5

MSOLDER-LESS ELECTRICAL ASSEMBLY AND PROCESS FOR ITS MANUFACTURE

FIELD OF THE INVENTION

The field of the present invention is solder-less electrical assemblies and processes for their manufacture.

BACKGROUND OF THE INVENTION

Electrical assemblies have long used lead solder to help make and keep electrical connections. However, use of solder, and especially lead solder, has come under increasing criticism due to environmental concerns.

The present invention is especially well-suited for, but not limited to use in, footwear and wearing apparel. For an electrical assembly to be useful in such fields it must be compact and inexpensive to manufacture. This means that both the number of parts, as well as the number of manufacturing steps, must be kept to the bare minimum if one is to be competitive in the world today.

The present invention advances a simple, compact and easy to manufacture electrical assembly that is well-suited for use in a variety of applications, including footwear and apparel. It also can be used in any application where it is desirable to use LEDs, including strings of LEDs, that can be used for decorative purposes.

The present invention improves upon prior inventions of the same inventor, including U.S. Pat. Nos. 7,147,337 and 8,004,856.

SUMMARY OF THE INVENTION

The present invention is generally directed to an electrical assembly, and a process for manufacturing it, in which the electrical assembly has a battery held within a battery block, a switch assembly attached to the battery block, a ribbon wire assembly held within a ribbon block and a PCB held within the battery and ribbon blocks. Two conductors in the battery block create electrical connections between the battery and the PCB after the battery is inserted into and held within the battery block. The ribbon wire assembly has one or more wires, preferably two or more, each of which has a protective covering with a gap that allows the wire to form an electrical connection with the PCB. All of the electrical connections between the PCB and the battery, the switch assembly and the ribbon wire assembly are made without the use of any solder.

In other aspects of the present invention, the first and second conductors have a u shape before they are assembled to the battery block assembly and at least one of their leads are bent over during assembly. In addition, one or more LEDs can be inserted into wire of the ribbon wire assembly without the use of any solder while the PCB contains electronics for controlling the electrical assembly and any LEDs. The PCB can be held within the battery and ribbon blocks by an interference fit and, optionally, locking fits, while the battery and ribbon blocks can be connected by a snap fit to form a completed assembly which surrounds the PCB. It is desirable for the battery to have a round shape and for PCB to have a radius in its battery block end for increasing its surface area of contact. No through hole electrical connections are needed to connect the PCB with any of the first and second conductors, the switch assembly and the ribbon wire assembly.

Accordingly, it is a primary object of the present invention to provide an improved electrical assembly and process for its manufacture.

This and further objects and advantages will be apparent to those skilled in the art in connection with the drawings and the detailed description of the preferred embodiment set forth below.

BRIEF DESCRIPTION OF THE DRAWINGS

FIG. 1 is an exploded assembly drawing illustrating an electrical assembly according to the present invention while FIG. 2 is a cross sectional view of the assembly of FIG. 1 in an unexploded state.

FIG. 3 illustrates a ribbon wire assembly used in the present invention with an LED to be inserted into to it as shown in FIG. 4 while FIG. 5 shows where sharp points of the LED leads have been bent to finish the assembly.

DETAILED DESCRIPTION OF THE INVENTION

Figure 1:
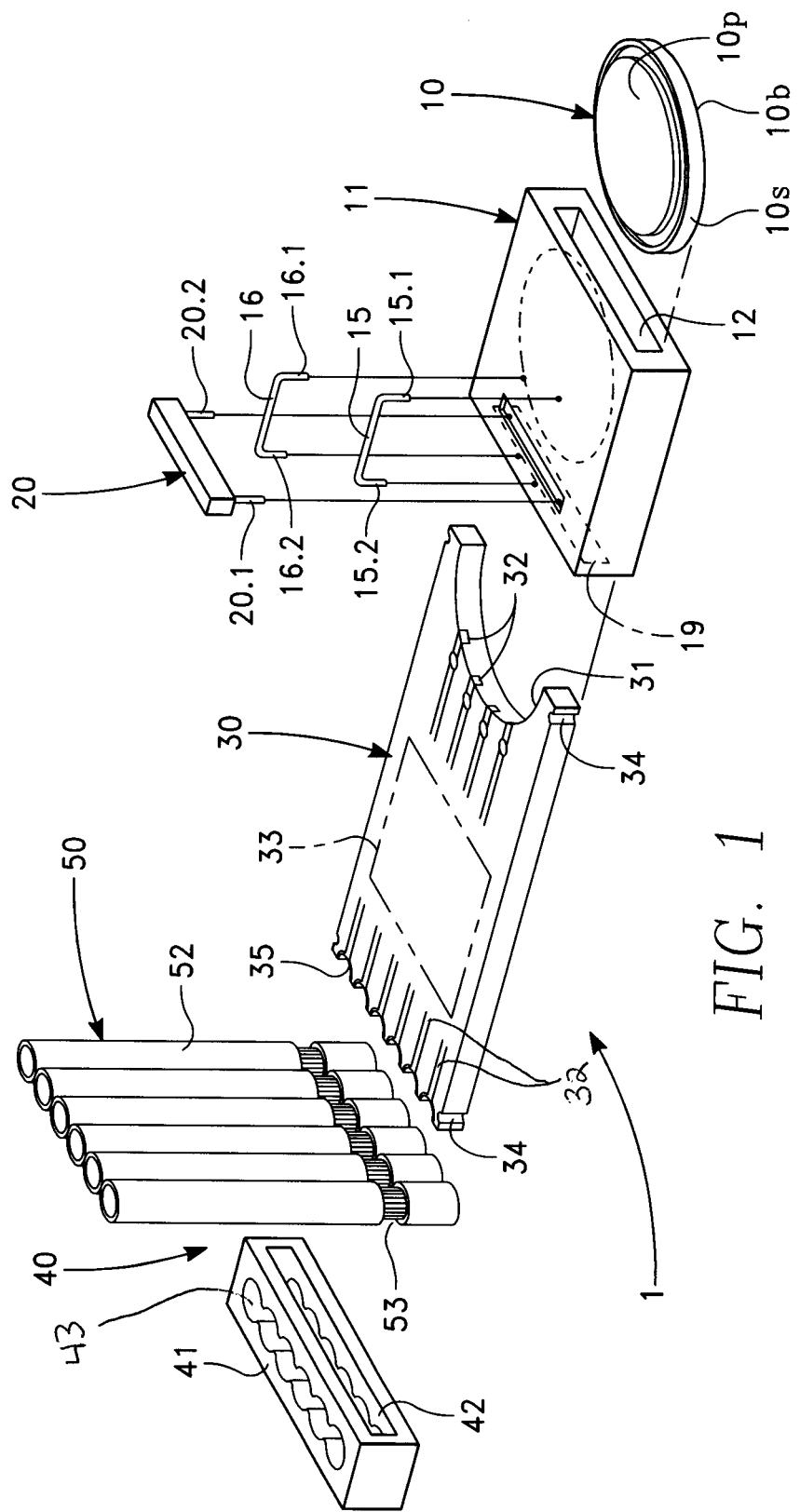

The present invention provides an electrical assembly that is easy to assembly without the use of solder and other expensive components. The electrical assembly is particularly well suited for use with LEDs, although it is not limited to products with LEDs.

In the Figures and the following description, number designations indicate various features of the invention, with like number designations referring to like features throughout both the drawings and the description. Although the Figures are described in greater detail below, the following is a glossary of the elements identified in the Figures.

Glossary:
1 electrical assembly
10 battery
10b negative bottom surface of battery 10
10p positive surface of battery 10
10s side surface of battery 10
11 battery block
12 battery opening (in battery block 11)
15 conductor
15.1 first lead of conductor 15
15.2 second lead of conductor 15
16 conductor
16.1 first lead of conductor 16
16.2 second lead of conductor 16
19 PCB opening (in battery block 11)
20 switch assembly
20.1 first switch assembly lead
20.2 second switch assembly lead
30 printed circuit board ("PCB")
31 radius (in PCB 30)
32 conductive traces and pads
33 electronics
34 female snap fit mating member in PCB
40 ribbon block assembly
41 ribbon block
42 PCB opening (in ribbon block 41)
43 ribbon opening (in ribbon block 41)
50 ribbon wire assembly
51 conductive wire
52 insulative covering (surrounding a conductive wire 51)
53 stripped portion of insulative covering 52
60 light emitting diode ("LED")
61.1 first LED lead
61.2 second LED lead
62 sharp point An electrical assembly according to the present invention, shown generally as 1, has six subcomponents that are assembled together—a battery 10, a battery block 11, a switch assembly 20, a PCB 30, a ribbon block assembly 40, and two conductors, 15 and 16.

Battery 10, in an especially preferred embodiment, is a lithium 3 volt button cell battery. This type of battery allows positive electrical contact to be made with its upper positive surface 10*p* and negative electrical contact to be made with either its side surfaces 10*s* or its bottom surface 10*b*.

Battery block 11, in an especially preferred embodiment, is a molded plastic material. Two conductors, 15 and 16, are attached to battery block 11 in either one or two assembly steps. Conductors 15 and 16 can be forced through a wall of battery block 11 or through preformed holes or pilot holes (not shown) can be used to assist in this assembly step. Conductors 15 and 16, which might be thought of as resembling u-shaped staples, are made of electrically conductive materials and each has two leads that extend down into an interior cavity of battery block where they will make electrical contact as is described later.

After conductors 15 and 16 have been assembled to battery block 11, battery 10 is inserted into battery opening 12 formed in battery block 11 where it will be held in place by a friction fit. During insertion of battery 10 into battery opening 12 first lead 15.1 of conductor 15 will come into contact with negative surface 10*p* of battery 10 and be bent over (see FIG. 2) to secure electrical contact with the battery and also assist with the friction fit. During the same insertion step first lead 16.1 of conductor 16 will make positive electrical contact with battery 10 and, in an especially preferred embodiment, the electrical contact will be made with a side surface 10*s* of battery 10. Making electrical contact with side surface 10*s* is especially preferred because it allows both conductors 15 and 16 to be assembled to the same surface of battery block 11, although conductor 16 could alternatively be assembled to a bottom surface and make electrical contact with negative bottom surface 10*b* of battery 10 in the same manner as was done with electrical conductor 15 and positive surface 10*p*.

Figure 6:
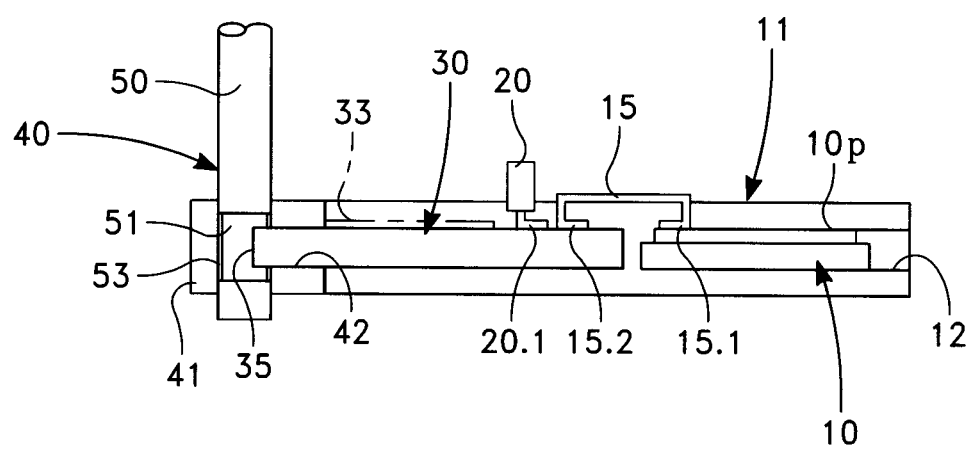
FIG. 6 illustrates an electrical assembly according to the present invention after the battery and ribbon blocks have been snap fit together.

After battery 10 is inserted into battery block 11, switch assembly 20 can be assembled to battery block 11. Switch assembly 20 can be designed so that it fits into an opening in battery block 11 and is held in place by a friction fit. Switch assembly 20 has first and second switch assembly leads 20.1 and 20.2 that extend into PCB opening 19 in battery block 11. Switch assembly 20 can be constructed so that extends above battery block 11, as shown in FIGS. 2 and 6, although it is preferable that the top of switch assembly 20 is flush with battery block 11 so as to make a more compact assembled module. Also, although FIG. 1 shows the opening in which switch assembly block 20 is inserted has four sides, it need not be so, and could instead be a three-sided notch formed in the end of battery block 11 where PCB 30 is inserted. Finally, the details of switch assembly 20 are not critical to the present invention, and any number of different switch assemblies can be used, an example of which is U.S. Pat. No. 7,347,577, the details of which are specifically incorporated herein by reference.

After switch assembly 20 has been assembled to battery block 11, PCB 30 is inserted into PCB opening 19. PCB 30 can carry a variety of electronics, shown generally as 33, to control electrical function of electrical assembly 1. (Electronics 33 can include, but do not necessarily need to include, a microprocessor.) Electronics 33 are pre-mounted on PCB 30 before PCB is assembled to battery block 11. PCB 30 has multiple conductive traces 32 aligned so that when PCB 30 is inserted into PCB opening 19 they will make electrical contact with second lead 15.2 of conductor 15, second lead 16.2 of conductor 16, and first and second switch assembly leads 20.1 and 20.2, and it is especially preferred that insertion of PCB 30 causes said four leads (15.2, 16.2, 20.1 and 20.4) to bend over so as to secure electrical conduct and also assist with creating a friction fit. PCB 30, in an especially preferred embodiment, has a radius 31 that increases the surface area for contact and PCB 30 is held within battery block 11 by a friction fit. PCB 30 can also have either male or female mating members (not shown) designed to mate in a snap fit fashion with corresponding female or male mating members in either or both of battery block 11 and ribbon block 41 (FIG. 1 shows four female mating members 34). Alternatively, and in an especially preferred embodiment shown in FIG. 6, PCB 30 does not have any male or female mating members and, instead, battery block 11 and ribbon block 41 snap fit together, holding PCB 30 inside, so as to create a small, self-contained module that can be used, for example, in footwear, clothing and other uses. Such a module can have transparent or translucent walls and also contain one or more LEDs positioned within such walls that can be seen through the walls when the module is appropriately positioned in footwear, clothing or the like.

After PCB 30 is inserted into PCB opening 19 of battery block 11 it is then inserted into PCB opening 42 of ribbon block 41, although the order of such assembly steps can be reversed.

Ribbon block assembly 40 is an assembly of ribbon block 41 and ribbon wire assembly 50. Ribbon wire assembly 50 has at least one wire, and usually groups of two or more wires, each of which has an insulative covering 52 surrounding it, with a portion of insulative covering 52 being stripped away (shown as 53 in FIG. 1) so as to allow electrical contact to be made with the wire. Ribbon block assembly 40 is inserted into ribbon opening 43 of ribbon block 41 where it is held in place by an interference fit. Once PCB 30 is fully inserted into PCB opening 42, conductive traces 32 will make electrical contact with conductive wires 51 at stripped portions 53 of insulative covering 52 (see FIG. 2). It has been found that such electrical contact can be made without the need to use through hole PCB connections, which reduces the cost of the PCB 30 needed in accordance with the present invention. (While it has been found that through hole PCB connections are not required for use with ribbon wire LEDs, to be described later, there may be other uses of electrical assemblies in which through hole PCB connections might be desirous, and such a possibility would still be within the scope of the present invention). It also bears note that the electrical connections formed between PCB 30 and both battery 10 and switch assembly 20 also do not require the use of through hole PCB connections.

Electrical assembly 1 of the present invention has many distinct advantages.

One major advantage of electrical assembly 1 is that it can be assembled without the use of any solder. This represents a significant advantage, especially as there is more and more concern about environmental effects of solder.

Another major advantage of electrical assembly 1 is ease of manufacturing and assembly, which greatly reduces cost. Because solder is not required, no soldering steps are required, thus reducing cost. Also, electrical assembly 1 can be manufactured from subcomponents with just six assembly steps, which greatly reduces its cost of manufacture.

Electrical assembly 1 is particularly well suited for use in applications where it can be used to power LEDs, some examples of which include footwear, clothing and strings of LEDs. In such a use one or more LEDs 60 can be assembled to electrical assembly 1, without the use of solder, by inserting first and second LED leads 61.1 and 61.2 of each LED 60 into wires 50. Each lead 61.1 and 61.2 has a sharp point 62 that facilitates insertion of the leads through insulative covering 52 of a wire. After such insertion, sharp point 62 can be bent over (see FIG. 5 which shows one direction in which the bending can occur, although bending at a ninety degree angle to that shown in FIG. 5 will also work) to secure the connection. Using this construction LEDs can be used in a variety of applications without the need for any solder whatsoever and such construction can be achieved by a simple assembly process that greatly reduces manufacturing cost.

Accordingly, the present invention discloses a simple, cost-effective electrical assembly and process of manufacture that is environmentally friendly and, in an especially preferred embodiment, well suited for use with LEDs. Moreover, the electrical assembly is compact and sturdy and well suited for use in a variety of applications, including for use in footwear and clothing.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. An electrical assembly, comprising:
    a battery block;
    a battery held within a battery block opening in the battery block;
    a switch assembly attached to the battery block having a first switch assembly lead and a second switch assembly lead;
    a printed circuit board ("PCB") having a first end held within a PCB opening in the battery block and a second end held within a ribbon block;
    a ribbon wire assembly held within the ribbon block; and
    a first conductor and a second conductor held within the battery block, each of the first and second conductors having a first lead in mechanical and electrical conduct with the battery without the use of any solder and a second lead in mechanical and electrical conduct with the PCB without the use of any solder, the first lead of the first conductor being electrically connected to a positive terminal of the battery and the first lead of the second conductor being electrically connected to a negative terminal of the battery;
    wherein the ribbon wire assembly is comprised of one or more wires having a protective covering with a gap which allows the one or more wires to form an electrical connection with the PCB without the use of any solder; and
    wherein the battery block and the ribbon block are connected by a snap fit to form a completed assembly which surrounds the PCB.

2. The electrical assembly of claim 1, wherein the first and second conductors have a u shape before they are assembled to the battery block assembly.

3. The electrical assembly of claim 2, wherein at least one of the first leads of the first and second conductors is bent over during assembly.

4. The electrical assembly of claim 1, wherein the at least one or more wires of the ribbon wire assembly is comprised of a first wire and a second wire.

5. The electrical assembly of claim 4, further comprising at least one light emitting diode ("LED") having a first LED lead inserted into the first wire to form a first electrical connection without the use of any solder and a second LED lead inserted into the second wire to form a second electrical connection without the use of any solder.

6. The electrical assembly of claim 5, wherein the PCB contains electronics for controlling the electrical assembly and the at least one LED.

7. The electrical assembly of claim 1, wherein the PCB is held within each of the battery block and the ribbon block by an interference fit.

8. The electrical assembly of claim 7, further comprising one or more locking fits formed between the PCB and each of the battery block and the ribbon block.

9. The electrical assembly of claim 1, wherein the battery has a round shape and the first end of the PCB has a radius for increasing a surface area of contact of the PCB.

10. The electrical assembly of claim 1, wherein the PCB does not use any through hole electrical connections to connect with any of the first and second conductors, the switch assembly and the ribbon wire assembly.

11. An electrical assembly, comprising:
    a battery block;
    a battery held within a battery block opening in the battery block;
    a switch assembly attached to the battery block having a first switch assembly lead and a second switch assembly lead;
    a printed circuit board ("PCB") having a first end held within a PCB opening in the battery block and a second end held within a ribbon block;
    a ribbon wire assembly held within the ribbon block assembly, said ribbon wire assembly being comprised of at least two wires, each of the at least two wires having a protective covering with a gap that allows the wire to form an electrical connection with the PCB without the use of any solder;
    a first conductor and a second conductor held within the battery block, each of the first and second conductors having a first lead in mechanical and electrical conduct with the battery without the use of any solder and a second lead in mechanical and electrical conduct with the PCB without the use of any solder, the first lead of the first conductor being electrically connected to a positive terminal of the battery and the first lead of the second conductor being electrically connected to a negative terminal of the battery; and
    at least one light emitting diode ("LED") having a first LED lead inserted into the first wire to form a first electrical connection without the use of any solder and a second LED lead inserted into the second wire to form a second electrical connection without the use of any solder;
    wherein the PCB contains electronics for controlling the electrical assembly and the at least one LED; and
    wherein the battery block and the ribbon block are connected by a snap fit to form a completed assembly which surrounds the PCB.

12. A process for manufacturing an electrical assembly, comprising:
    inserting a battery into a battery block so to form both a positive electrical connection with a first conductor and a negative electrical connection with a second conductor without the use of any solder;

attaching a switch assembly to the battery block without the use of any solder;

inserting a first end of a printed circuit board ("PCB") into the battery block so as to form solder-less electrical and mechanical connections with the first conductor, the second conductor and the switch assembly;

inserting a second end of the PCB into a ribbon block containing a ribbon wire assembly comprised of one or more wires having a protective covering with a gap so as to electrically connect the second end of the PCB with the one or more wires without the use of any solder;

wherein the battery block and the ribbon block are connected by a snap fit to form a completed assembly which surrounds the PCB.

13. The process of claim 12, comprising the further step of: inserting the ribbon wire assembly into the ribbon block.

14. The process of claim 12, comprising the further step of: inserting the first and the second conductors into the battery block.

15. The process of claim 12, wherein the at least one or more wires of the ribbon wire assembly is comprised of a first wire and a second wire.

16. The process of claim 15, comprising the further step of: inserting a first LED lead of at least one light emitting diode ("LED") into the first wire to form a first electrical connection without the use of any solder and inserting a second LED lead of the at least one LED into the second wire to form a second electrical connection without the use of any solder.

17. The process of claim 12, wherein the first and second conductors have a u shape before they are assembled to the battery block assembly and at least one lead of the first and second conductors is bent over during assembly.

* * * * *